(12) United States Patent
Asbjornsen et al.

(10) Patent No.: US 9,529,393 B2
(45) Date of Patent: Dec. 27, 2016

(54) MULTI-FUNCTION KEY IN A KEYBOARD FOR AN ELECTRONIC DEVICE

(71) Applicant: Intel Corporation, Santa Clara, CA (US)

(72) Inventors: Steven W. Asbjornsen, Tualatin, OR (US); Soren C. Knudsen, Hillsboro, OR (US); Stevan Wittenbrock, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/126,317

(22) PCT Filed: Sep. 28, 2013

(86) PCT No.: PCT/US2013/062501
§ 371 (c)(1),
(2) Date: Dec. 13, 2013

(87) PCT Pub. No.: WO2015/047358
PCT Pub. Date: Apr. 2, 2015

(65) Prior Publication Data
US 2015/0091801 A1     Apr. 2, 2015

(51) Int. Cl.
*G09G 5/00*     (2006.01)
*G06F 1/16*     (2006.01)
(Continued)

(52) U.S. Cl.
CPC .............. *G06F 1/1662* (2013.01); *G06F 1/169* (2013.01); *G06F 1/1671* (2013.01); *G06F 3/0338* (2013.01); *G06F 3/03547* (2013.01)

(58) Field of Classification Search
CPC ...... G06F 3/0219; G06F 3/0213; G06F 3/023; G06F 3/0482; G06F 17/212; G06F 17/24; G06F 17/241; G06F 17/245; G06F 1/1662; G06F 3/0484; G06F 3/0236; G06F 3/0237; G06F 3/011; G06F 3/038; G06F 3/04; G06F 3/04842; G06F 1/169; G06F 3/0486; G06F 3/0383; G06F 3/04815; G06F 1/1671; G06F 3/0317; G06F 3/0312; G06F 3/03547; G06F 3/04892; G06F 3/033; G06F 3/03548; G06F 3/0489; G06F 9/4443; G06F 3/03543; G06F 3/03549; G06F 3/0414
(Continued)

(56) References Cited

U.S. PATENT DOCUMENTS

2004/0183786 A1     9/2004   Jam
2007/0200823 A1*    8/2007   Bytheway et al. ........... 345/160
(Continued)

FOREIGN PATENT DOCUMENTS

KR     10-2011-0094737     8/2011

OTHER PUBLICATIONS

PCT International Search Report and Written Opinion received for PCT Patent Application No. PCT/US2013/062501, mailed on Jun. 25, 2014.
(Continued)

*Primary Examiner* — Duc Dinh
(74) *Attorney, Agent, or Firm* — Patent Capital Group

(57) ABSTRACT

Example embodiments described herein can include a display portion including a display; and a keyboard portion including a plurality of keys. One of the plurality of keys is a multi-function key configured to register a character on the display, and the multi-function key is configured to control movement of a cursor in multiple directions on the display. In yet other embodiments, the multi-function key is a space bar having a surface area substantially larger than other keys
(Continued)

of the plurality of keys. The multi-function key can be rectangular shaped and sufficiently large to receive simultaneous contacts associated with each thumb of a user when the user types on the keyboard portion.

25 Claims, 12 Drawing Sheets

(51) Int. Cl.
   *G06F 3/0338* (2013.01)
   *G06F 3/0354* (2013.01)
(58) Field of Classification Search
   USPC .................................................. 345/168–173
   See application file for complete search history.

(56) References Cited

U.S. PATENT DOCUMENTS

| 2009/0115732 | A1 | 5/2009 | Tao et al. | |
|---|---|---|---|---|
| 2012/0019448 | A1 | 1/2012 | Pitkanen et al. | |
| 2012/0242578 | A1* | 9/2012 | Laubach | 345/160 |

OTHER PUBLICATIONS

PCT International Preliminary Report on Patentability received for PCT Patent Application No. PCT/US2013/062501, mailed on Mar. 29, 2016.

* cited by examiner

MULTI-FUNCTION KEY IN A KEYBOARD FOR AN ELECTRONIC DEVICE

TECHNICAL FIELD

Embodiments described herein generally relate to the field of electronic devices, and more particularly, to a multi-function key in a keyboard for an electronic device.

BACKGROUND

End users have more electronic device choices than ever before. A number of prominent technological trends are currently afoot (e.g., more computing devices, thinner lighter devices, etc.), and these trends are changing the electronic device landscape. One of the technological trends is a growing demand for extremely light and thin keyboards to reduce the bulk and weight. Another trend is to deliver a good touch typing experience. However, as conventional key heights are lowered to provide thinner keyboards, the profile of a user's thumbs becomes an issue. For some users, the thumb's typical posture of being parallel to the typing surface often causes the thumb to bridge the space bar on thin keyboards (or the depressions that represent the space bar), resulting in no pressure being applied to the designated space key area. In addition, there are several options for controlling a cursor on a display, however, nearly all of these cause gaps in the users thought flow as the user must move their finger or the entire hand between typing and controlling the cursor on the display. This often causes touch typers to reposition their fingers between typing and controlling the cursor. Hence, there is a desire for an improved space bar area as well as an improved means for controlling the cursor.

BRIEF DESCRIPTION OF THE DRAWINGS

Embodiments are illustrated by way of example and not by way of limitation in the FIGURES of the accompanying drawings, in which like references indicate similar elements and in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

Example embodiments described herein can include a display portion including a display; and a keyboard portion including a plurality of keys. A selected one of the plurality of keys is a multi-function key configured to register a character on the display, and the multi-function key is configured to control movement of a cursor on the display. In yet other embodiments, the multi-function key is a space bar having a surface area substantially larger than other keys of the plurality of keys. The multi-function key can be rectangular shaped and sufficiently large to receive simultaneous contacts associated with each thumb of a user when the user types on the keyboard portion.

In other implementations, the multi-function key is a J key or an F key on a QWERTY keyboard. In addition, logic can be provided to determine if input on the multi-function key is associated with registering the character on the display or is associated with controlling movement of a cursor on the display. The multi-function key can be teardrop shaped and sufficiently large to receive simultaneous contacts associated with each thumb of a user when the user types on the keyboard portion. In certain cases, a multi-function key actuator is configured to register the character on the display, and to control movement of the cursor on the display. A dragging motion across the multi-function key causes the multi-function key to control movement of the cursor on the display.

Example Embodiments

The following detailed description sets forth example embodiments of apparatuses, methods, and systems relating to heads up display configurations for an electronic device. Features such as structure(s), function(s), and/or characteristic(s), for example, are described with reference to one embodiment as a matter of convenience; various embodiments may be implemented with any suitable one or more of the described features.

Figure 1:
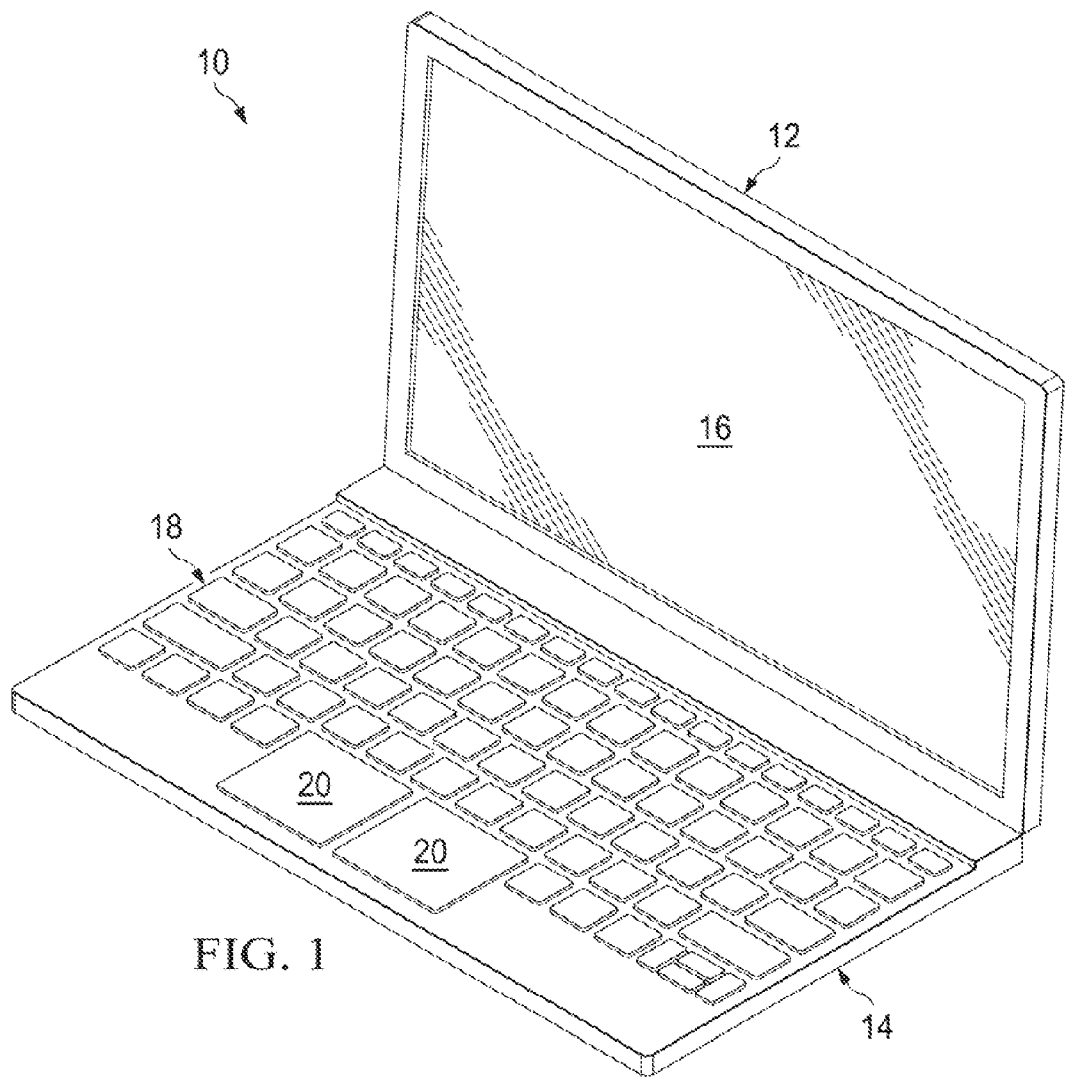
FIG. 1 is a simplified orthographic view illustrating an embodiment of an electronic device, in accordance with one embodiment of the present disclosure.

FIG. 1 is a simplified orthographic view illustrating an embodiment of an electronic device 10 in an open configuration in accordance with one embodiment of the present disclosure. Electronic device 10 may include a display portion 12 and a keyboard portion 14. Display portion 12 can include a display 16. Display 16 may be disposed within/on and/or supported by display portion 12. In one or more embodiments, display 16 is a screen that can be a liquid crystal display (LCD) display screen, a light-emitting diode (LED) display screen, an organic light-emitting diode (OLED) display screen, a plasma display screen, or any other suitable display screen system.

Keyboard portion 14 can include a keyboard 18. Keyboard 18 may be a QWERTY keyboard. Keyboard 18 can include a multi-function space key 20. Multi-function space key 20 may be a keyboard space key sized to an area large enough to receive a contacting edge of either thumb of a user when the user is in a touch-typing posture. Multi-function space key 20 may be two rectangular shapes (as illustrated in FIG. 1), one relatively large rectangular shape, a teardrop shape for each thumb, or any number of shapes that achieve the objective of receiving the connecting edge of either thumb of the user when the user is in a touch-typing posture. Multi-function space key 20 can be configured to input a space character or to control movement of a cursor (or mouse pointer) on display 16. Keyboard portion 14 may be a standalone peripheral device (e.g., a Bluetooth keyboard) that includes a battery as the primary power for the keyboard's onboard processors, radios, and sensors. Processors in keyboard portion 14 can interpret key pressure intention (e.g., any type of pressure sensitive sensor, for example) and communicate either key or mouse commands to another electrical device (e.g., a phone, tablet, laptop, personal computer, etc.). Further, keyboard portion 14 may be part of a configurable computer system (e.g., a convertible laptop) where display portion 12 can be removed from keyboard portion 14 and electronic device 10 can essentially function in either a clamshell configuration, tablet configuration, or a movie mode configuration.

In general terms, electronic device 10 can include a keyboard assembly having a space key sized to an area large enough to receive the contacting edge of either thumb of a user when in a touch-typing posture. In addition, the space key (or almost any other key on the keyboard) can be configured to be used for character input as well as for cursor control. Electronic device 10 can include control logic to allow the system to determine if the input from a multi-function key was intended to add a character (e.g., a space character) or was intended to control a cursor. Sizing the space key to an area large enough to receive the contacting edge of the thumb of a user and adding the ability for a key to be used as character entry or to control a cursor can create an improved space bar area as well as provide an improved method for controlling the cursor For purposes of illustrating certain example features of electronic device 10, the following foundational information may be viewed as a basis from which the present disclosure may be properly explained. Traditionally, keyboard configurations for thin keyboards fail to offer an acceptable user experience. There is a growing demand for extremely light and thin keyboards to reduce the bulk and weight of delivering a good touch typing experience. Tablets provide full virtual keyboards using the touch surface as the keyboard, but touch-typing is not practical since there is no tactical reference to locating keys by feel. This is a problem for virtually all keyboards that attempt to minimize keyboard height by displaying key areas on flat surfaces. Only physical keyboards can provide a physical tactical reference.

However, as conventional physical key heights are lowered to provide thinner keyboards, the profile of a user's thumbs becomes an issue. Historically, keyboards of all types have uniquely treated the key for typing a space character as a single, very wide key or "spacebar" while maintaining its depth and height to be roughly equivalent to neighboring keys. This arrangement works well at addressing the unique angle and range of positional variance thumbs present from user to user when typing in the conventional touch-typing posture. However, while this works well for conventional keyboards with raised mechanical keys, touch typing with thumbs on thin keyboards, which provide little or no vertical travel, can dramatically degrade the typing experience. Some ultra-thin membrane style keyboards have attempted to use depressions on a uniform surface to provide a tactical feel for the key area where a classic wide space-bar key shape is virtually non-functional. For most users, the thumb's typical posture of being parallel to the typing surface causes the thumb to bridge the depressions, resulting in no pressure being applied to the space key's recessed target area, no matter how wide it is.

In addition, with a typical laptop (and a normal style of keyboard) there are several options for controlling a cursor on the display. Examples include a TrackPoint®, trackpad, external mouse, touch screen display, etc. However, nearly all of these cause gaps in the users thought flow as the user must move their finger or the entire hand between typing and controlling where the cursor is on the display. One problem, which can be exacerbated on a flat keyboard, is that the fingers have to be repositioned for a user to switch from keyboard entry to cursor control on the display. Trackpads may be the least obtrusive, but it is rare for a user to keep all their fingers on the keyboard home-rows while using their thumbs to move the mouse cursor around. There is a strong desire for an improved method for controlling the cursor that is not only less disruptive to the users thought flow but also allows for lower cost, lower size, lower weight, and ease of use.

Particular embodiments described herein provide for an electronic device, such as a notebook computer, laptop, cellphone, or other mobile device that includes a circuit board coupled to a plurality of electronic components (which includes any type of components, elements, circuitry, etc.). The electronic device may also include a keyboard assembly having a keyboard space key sized to an area large enough to receive the contacting edge of either thumb of the user when in a touch-typing posture. This could be a relatively large rectangular shape, a teardrop shape for each thumb, or any number of shapes that achieve the objective. Using indents to represent key targets may be effective in enhancing the touch-typing experience of ultra-thin keyboards. In some instances, the oversized space key may be preferred with low-profile raised key keyboards. In an embodiment, the keyboard is a QWERTY keyboard and the dimensions of the A key and the ":/;" key may be from what is typically found in a QWERTY keyboard layout. For example, each key may be longer in the horizontal x-axis to accommodate little finger anthropometrics in each hand of a user. When typing on a low profile keyboard were the key tops reside on a flat plane, the keys may improve input speed and accuracy Implementing the spacebar as a large rectangular shape also presents the opportunity to add complementary technology to enable the area to be used as both a track pad to control cursor movement and as a spacebar. Control logic may be added to the system to allow the intention of adding a space character to be distinguished from an intention to control a cursor or a cursor tap (simulated mouse click). For example, a dragging action on the surface of a trackpad can be a distinct queue that cursor control is desired. The example is only one of the many other methods or means for activating the cursor control functions of a multi-function key. Virtually any other methods or means may be used to activate the cursor control function of a multi-function key and, thus, are clearly within the scope of the present disclosure.

Since typing and cursor control are rarely, if ever, attempted simultaneously, enabling both functions in the same space creates no practical conflicts in usage. Moreover, delivering both types of functionality with the same space creates an even higher level of space efficiency in ultra-thin designs. In an embodiment, a trackpad could simply be moved up into the area reserved for the spacebar, allowing the keyboard/trackpad combo to occupy less space overall. In another embodiment, cursor control may be enabled on one or more keys in an area that a primary pointer finger of the user naturally rests (e.g., on a QWERTY keyboard, in the vicinity of the J key for right handed users or the F key for left-handed users). Further, virtually any key on a keyboard could be configured for multi-function use as a character input and for cursor control. The term character, used in character input and generally throughout this application, is meant to include letters, numbers, symbols, signs, commands, and any other type of input that may be input to an electrical device using a keyboard or keypad.

In use, detection logic in the system can determine when an area or key is intended to be used as a keyboard key to input a character or is to be used for cursor control. By enabling both functions in the same key, less keyboard real estate is needed for cursor control. In flat keyboards, there is not the physical height to add in something like a TrackPoint® between the keys. Assigning a pressure sensitive pad to work as a pressure sensitive input device that can function as a character input and as a cursor control can help maintain a flat or thin keyboard.

In an embodiment, if a J key is a multi-function key, the electronic device can contain logic that has the ability to determine if a user is trying to type the letter "j" or use the J key as a cursor control. [Note that almost any key on the keyboard may be used as a multi-function key.] By differentiating each user's "tap" vs. "moving pressure" the system can enable both functions in the same key. When the users finger is on the J key, (even if the key is perfectly flat) pressure applied towards the Y key (i.e., up towards the top of the keyboard on a QWERTY keyboard) can cause the mouse cursor to move up on the display. Similarly, changing the direction of applied force on the J key can move the cursor in the direction of the applied force (e.g., applied force on the left of the key would move the cursor left, applied force on the right of the key would move the cursor right, etc.). On a flat keyboard, the system may integrate a multi-function key with pressure sensitive keyboard technology, such that the system can distinguish between a key press for character input and for cursor control. The system may also have the ability to learn the different types or styles of input for different users, and create and implement the drivers for both cursor control and a key press input. By making the key multi-functional, a user can control the cursor without removing their hands from the typing position. In addition, from "mouse" or cursor control to typing and back can be done with less lag time than current methods used today.

In one or more embodiments, electronic device 10 is a notebook computer or laptop computer. In still other embodiments, electronic device 10 may be any suitable electronic device having a display and a keyboard (including a virtual keyboard) such as a mobile device, a tablet computer and/or a tablet device (e.g., an i-Pad®, a Microsoft Surface™, Google Nexus™, etc.), a personal digital assistant (PDA), a smartphone, an audio system, a movie player of any type, a computer docking station, etc. Further, the keyboard may be a standalone peripheral keyboard (e.g., a Bluetooth keyboard) that includes a battery as the primary power for the keyboard's onboard processors, radios, and sensors. The processors in the keyboard can interpret key pressure intention and communicate either key or mouse commands to another electrical device (e.g., a phone, tablet, laptop, personal computer, etc.). In addition, the keyboard may be part of a configurable computer system (e.g., a convertible laptop) that has a detachable display and can essentially function in either a clamshell configuration, tablet configuration, or a movie mode configuration. In an embodiment, the keyboard may be charged wirelessly.

For a particular keyboard design, there is enough separation between the keys to make it easier for touch-typers to distinguish between keys (including the space bar) for improved touch-typing. The keyboard can be made from a laminate construction that uses variations of key design shapes to replicate a touch-typing user experience. The keys can be of any suitable type such as toggle operation keys, for example. In operation, the spacing between the keys of the keyboard can enable a touch-typer to distinguish between keys using their fingers. Edge keys can be specially designed for thinner sides.

The keyboard can also provide a keypress confirming the depression of the key. In certain implementations, the keyboard keys are biased upward with electrically conductive pads beneath the keys, which trigger a keypress. For the actual keyboard construction, a laminate construction may be employed in conjunction with an injection mold. A flexible printed circuit board (FPC) can also be used in certain embodiments of the present disclosure. A small battery may be optionally inserted into the keyboard to provide a limited backup power supply. Other embodiments of the keyboard can include any suitable dimensions, sizes, and shapes: all of which are encompassed by the present disclosure.

For the actual keys, tactile feedback can be provided (e.g., 70 gram with "cliff drop" force deflection feel) to mimic the typing experience of traditional keyboards. In certain implementations, there is little (or no) dead space on the keyboard surface. There can be various types of keys on the keyboard including multi-function keys that can be used for a character entry and to control a cursor on a display, pivoting keys (e.g., left edge: tilde, tab, caps lock, shift, left ctrl; right edge: backspace, backslash, enter, shift), rocking keys such as the arrow keys, and substantially vertical travel keys such as function keys.

Note that any number of connectors (e.g., Universal Serial Bus (USB) connectors (e.g., in compliance with the USB 3.0 Specification), Thunderbolt™ connectors, WiFi connectors, a non-standard connection point such as a docking connector, etc.) and a plurality of antennas can be provisioned in conjunction with electronic device 10. [Thunderbolt™ and the Thunderbolt logo are trademarks of Intel Corporation in the U.S. and/or other countries.] The antennas are reflective of electrical components that can convert electric currents into radio waves. In particular examples, the antennas can be associated with WiFi activities, wireless connections more generally, small cell deployments, Bluetooth, 802.11, etc.

In at least one example embodiment, the motherboard of electronic device 10 is a general circuit board that can hold various components of the internal electronic system of electronic device 10. The components may include a central processing unit (CPU), a memory, etc. The motherboard can also couple to one or more connectors in order to accommodate other peripherals sought to be used by a user of electronic device 10. More specifically, the motherboard can provide the electrical connections by which the other components of the system can communicate.

Any processors (inclusive of digital signal processors, microprocessors, supporting chipsets, etc.), memory elements, etc. can be suitably coupled to the motherboard based on particular configuration needs, processing demands, computer designs, etc. Other components such as external storage, controllers for video display, sound, and peripheral devices may be attached to the motherboard as plug-in cards, via cables, or integrated into the motherboard itself.

Note that particular embodiments of the present disclosure may readily include a system on chip (SOC) central processing unit (CPU) package. An SOC represents an integrated circuit (IC) that integrates components of a computer or other electronic system into a single chip. The chip may contain digital, analog, mixed-signal, and often radio frequency functions: all of which may be provided on a single chip substrate.

Figure 2:
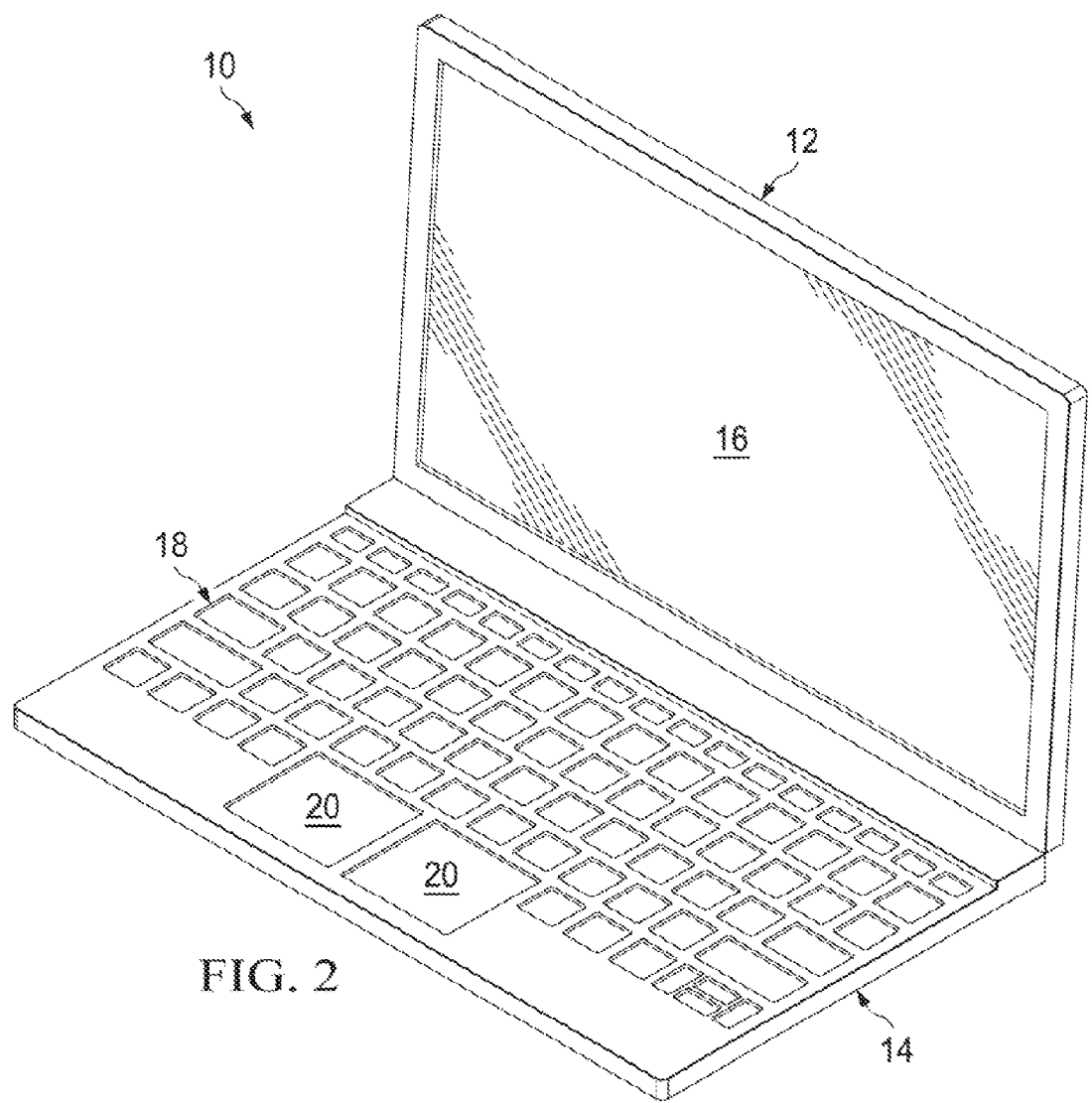
FIG. 2 is a simplified orthographic view illustrating an embodiment of an electronic device, in accordance with one embodiment of the present disclosure.

Turning to FIG. 2, FIG. 2 is a simplified orthographic view illustrating indented keys of keyboard 18 of electronic device 10. In an embodiment, multi-function space key 20 can include a touch sensor implemented using any suitable touch-sensitive technology such as, for example and without limitation, capacitive, resistive, surface acoustic wave (SAW), infrared, and optical imaging. In another embodiment, electronic device 10 includes an 18.5 mm pitch thin keyboard that provides for an optimal touch-typing experience. The main components of keyboard 18 can include a keyboard body reflective of a unibody-molded part that may use insert and/or comolding methods to eliminate visible fasteners. In addition, the keyboard body may further include insert-molded band features to provide stiffness to the outer portion of the scoop geometry as well as transmit rotational loads, which inhibit display portion 12 from rotating with respect to keyboard portion 14. Electrical current can be passed from display portion 12 to keyboard portion 14 to recharge an on-board battery or capacitor, or power any number of items (e.g., a Bluetooth radio).

Figure 3:
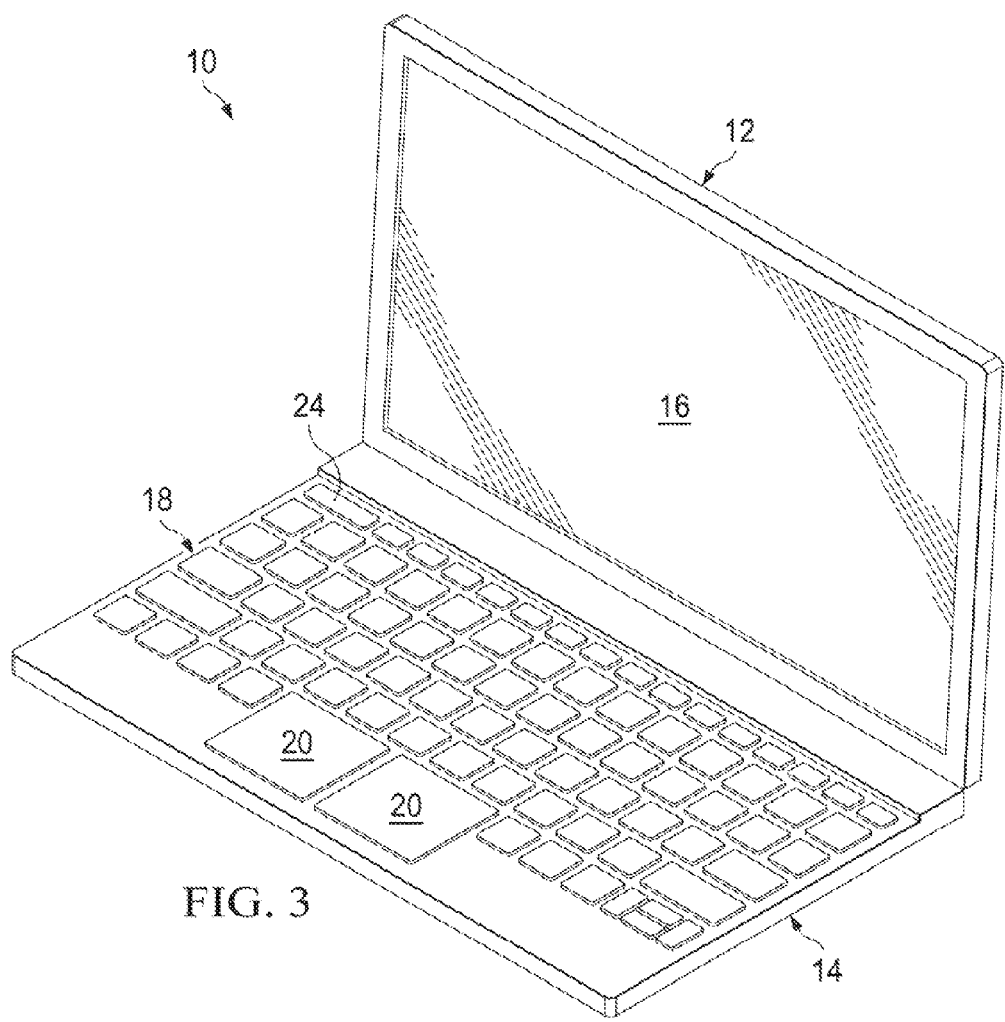
FIG. 3 is a simplified orthographic view illustrating an embodiment of an electronic device, in accordance with one embodiment of the present disclosure.

Turning to FIG. 3, FIG. 3 is a simplified schematic diagram illustrating an orthographic view of electronic device 10. Electronic device 10 may include display portion 12 and keyboard portion 14. Keyboard portion 14 can include keyboard 18. Keyboard 18 can include multi-function space key 20 and a cursor control switch 24. Cursor control switch 24 can be configured to allow multi-function space key 20 to function as a space key and, when cursor control switch 24 is activated, to function as a cursor control. While cursor control switch 24 is illustrated as being located in an area of keyboard 18 where function keys or an escape key is typically located, cursor control switch 24 may be located anywhere on keyboard 18. Further, cursor control switch 24 may be an existing key on keyboard 18 that has been to function as a cursor control switch.

Figure 4:
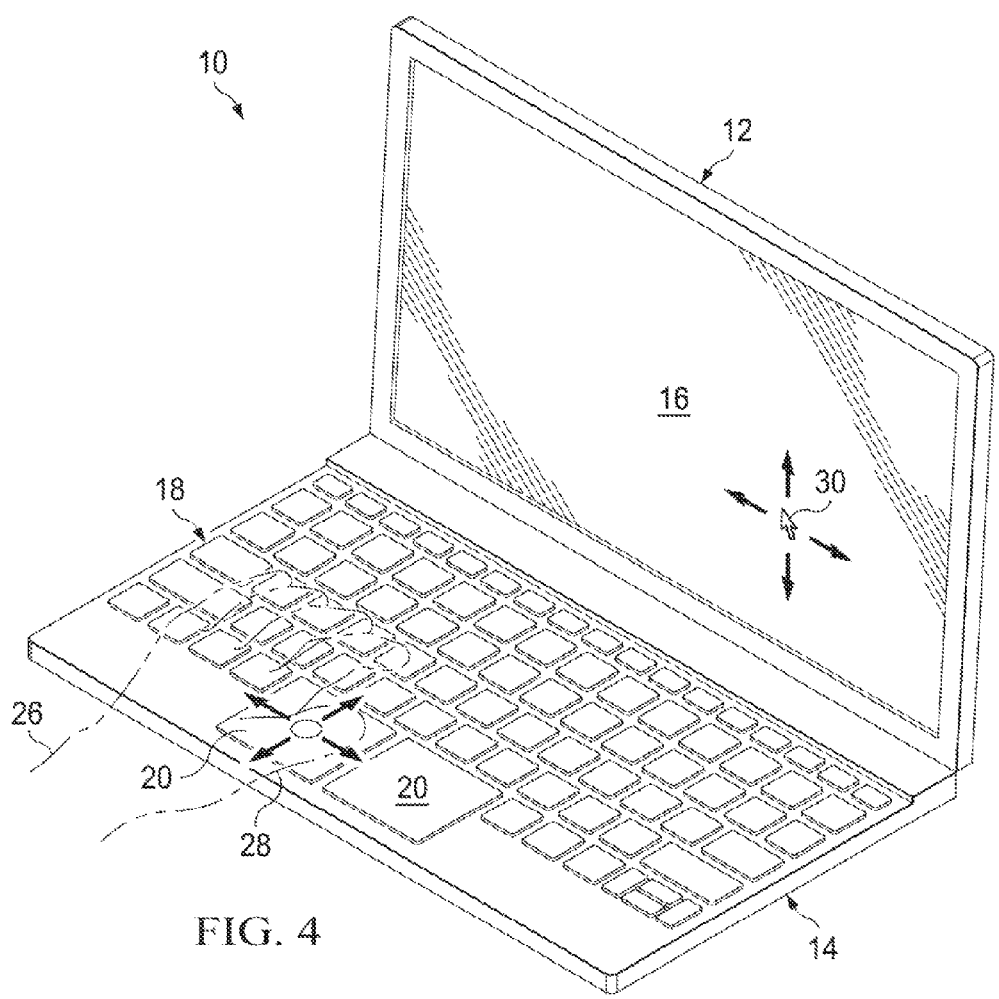
FIG. 4 is a simplified orthographic view illustrating an embodiment of an electronic device, in accordance with one embodiment of the present disclosure.

Turning to FIG. 4, FIG. 4 is a simplified schematic diagram illustrating an orthographic view of electronic device 10. As illustrated in FIG. 4, a user's hand 26 is on keyboard 18. The user may use a thumb 28 to interact with multi-function space key 20. Thumb 28 can be used to enter a space character by tapping on multi-function space key 20 similar to the way the user would tap on any other key to enter a character. In addition, thumb 28 can be used to control a cursor 30 on display 16 by activating the cursor control function of multi-function space key 20. The cursor control function may be activated by activating a cursor control switch (e.g., cursor control switch 24), pressing down on multi-function space key 20 for a period of time longer than what would be used if the user was attempting to enter a character and then move the thumb around the multi-function space key 20, by swiping or sliding the thumb over multi-function space key 20, or some other similar action by the user.

Figure 5:
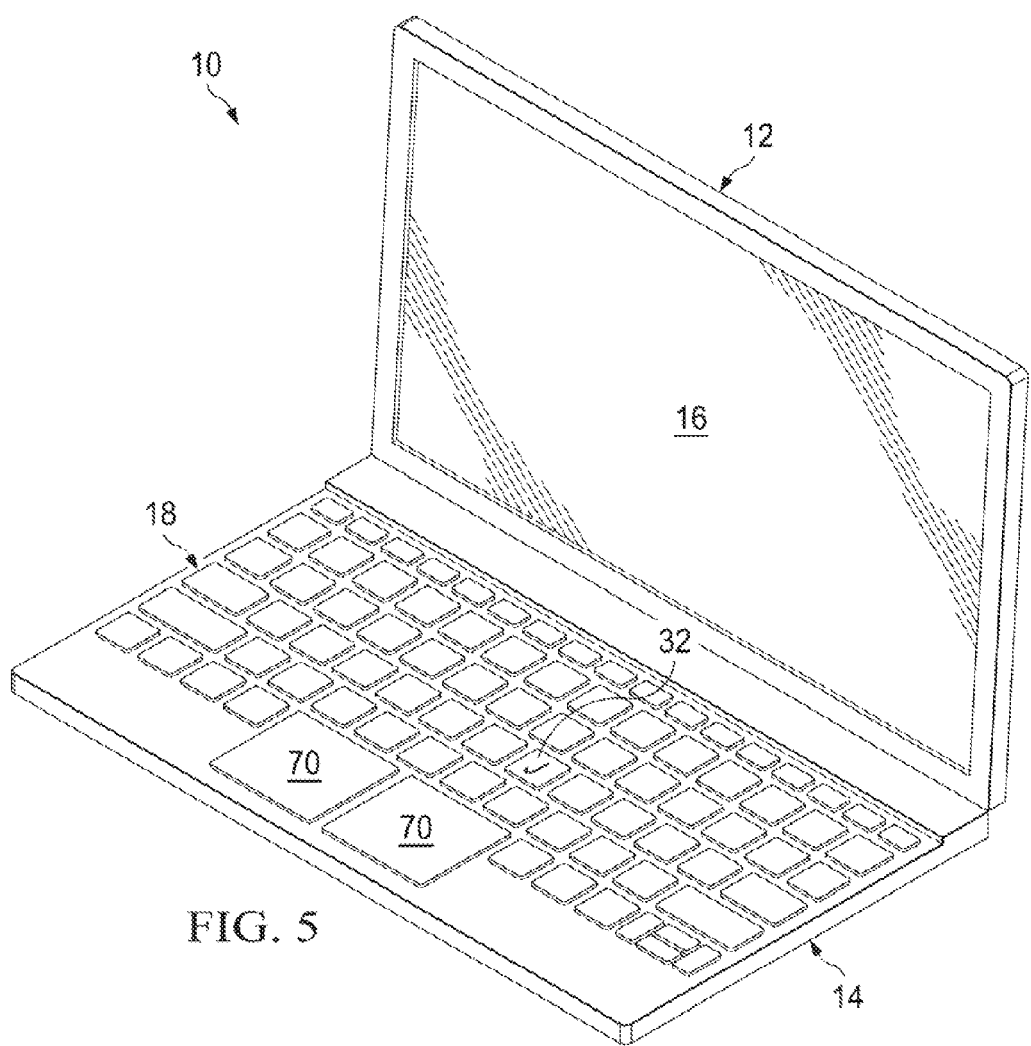
FIG. 5 is a simplified orthographic view illustrating an embodiment of an electronic device, in accordance with one embodiment of the present disclosure.

Turning to FIG. 5, FIG. 5 is a simplified schematic diagram illustrating an orthographic view of electronic device 10. Electronic device 10 may include display portion 12 and keyboard portion 14. Display portion 12 can include display 16. Keyboard portion 14 can include keyboard 18. Keyboard 18 can include oversize space key 70 and a multi-function J key 32. Oversized space key 70 is sized to an area large enough to receive the contacting edge of either thumb of the user when in a touch-typing posture. In an embodiment, oversized space key 70 does not have any multi-function properties. Multi-function J key 32 can be configured to function as a "j" character key and to function as a cursor control. The cursor control function of multi-function J key 32 may be activated by pressing down on multi-function J key 32 for a period of time longer than what would be used if the user was attempting to enter the character "j" and then move multi-function J key 32 around similar to using a pointing stick (e.g., a TrackPoint®) or some other similar action by the user. Movements of multi-function J key 32 can be echoed on display 16 by movements of a pointer (e.g., cursor 30) and other visual changes. In an embodiment, multi-function J key 32 can operate by sensing applied force by using a pair of resistive strain gauges and the velocity of the pointer can depend on the applied force to multi-function J key 32.

Figure 6:
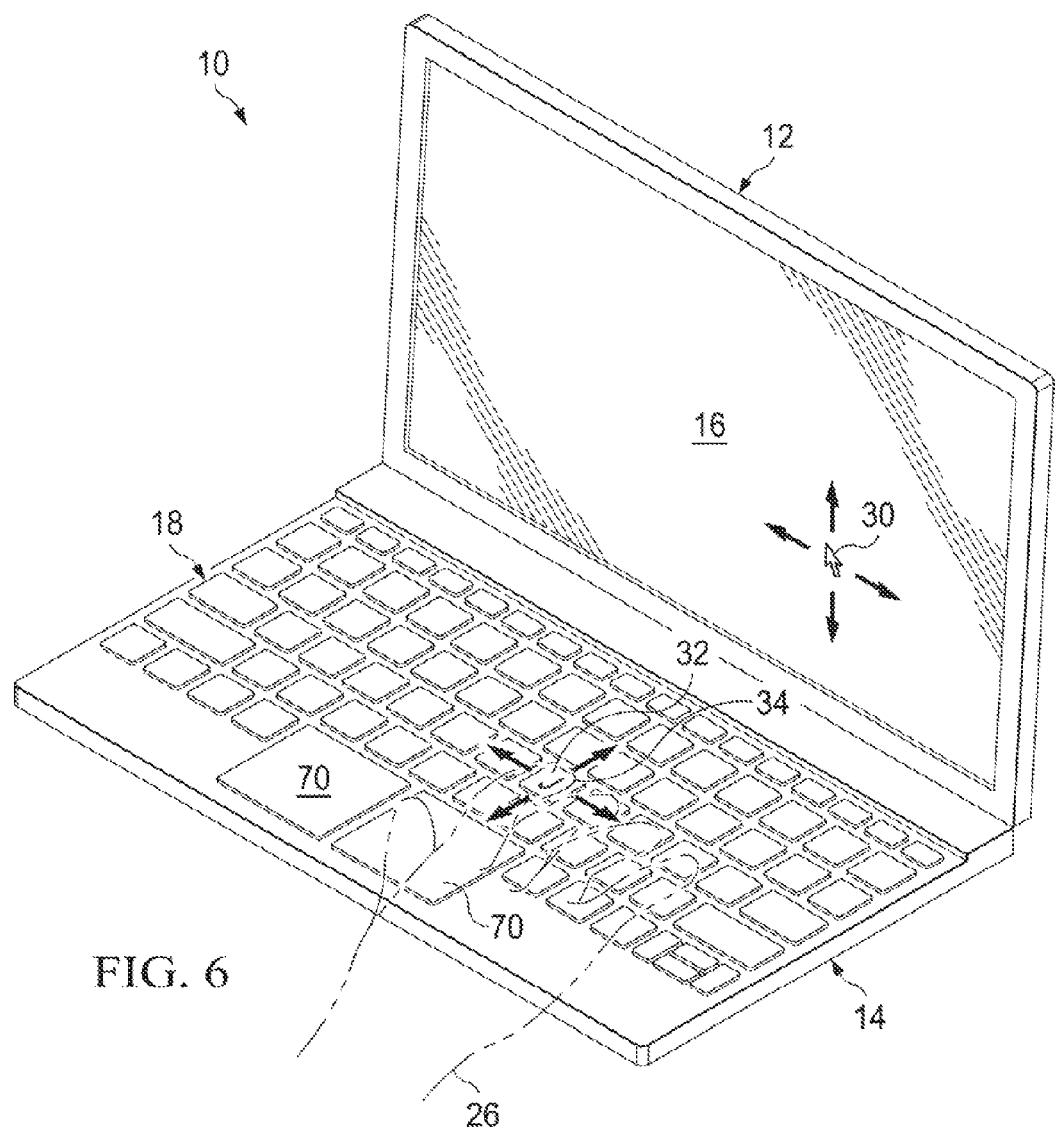
FIG. 6 is a simplified orthographic view illustrating an embodiment of an electronic device, in accordance with one embodiment of the present disclosure.

Turning to FIG. 6, FIG. 6 is a simplified schematic diagram illustrating an orthographic view of electronic device 10. As illustrated in FIG. 6, user's hand 26 is on keyboard 18. The user may use a finger 34 (e.g., the index finger) to interact with multi-function J key 32. Finger 34 can be used to enter a "j" character by tapping on multi-function J key 32 similar to the way the user would tap on any other key to enter a character. In addition, finger 34 can be used to control cursor 30 on display 16 by activating the cursor control function of multi-function J key 32. The cursor control function may be activated by pressing down on multi-function J key 32 for a period of time longer than what would be used if the user was attempting to enter a character and then move multi-function J key 32 around or some other similar action by the user.

Figure 7:
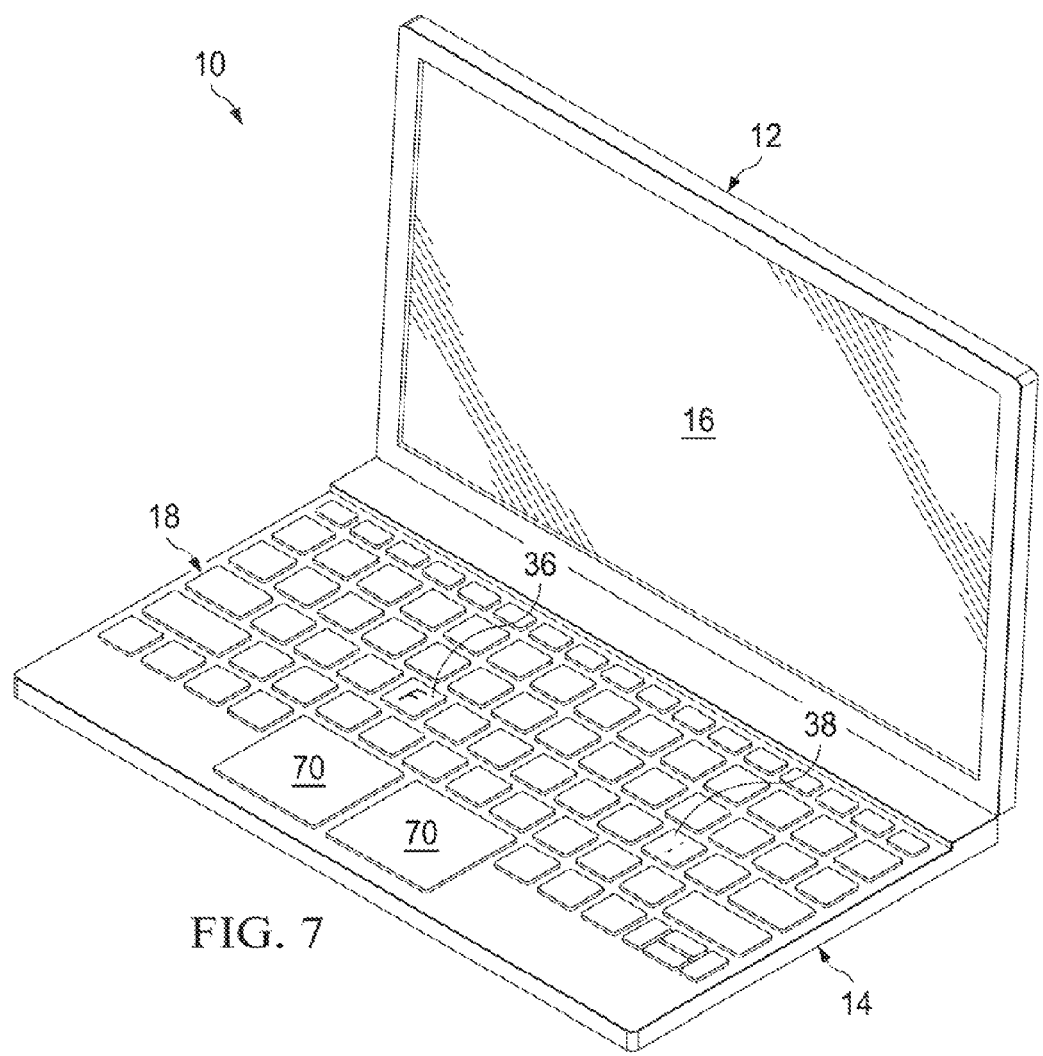
FIG. 7 is a simplified orthographic view illustrating an embodiment of an electronic device, in accordance with one embodiment of the present disclosure.

Turning to FIG. 7, FIG. 7 is a simplified schematic diagram illustrating an orthographic view of electronic device 10. Electronic device 10 may include display portion 12 and keyboard portion 14. Display portion 12 can include display 16. Keyboard portion 14 can include keyboard 18. Keyboard 18 can include oversize space key 70 and a multi-function F key 36. Multi-function F key 36 can be configured to function as an "f" character key and, when activated, to function as a cursor control. The cursor control function of multi-function F key 36 may be activated by pressing down on multi-function F key 36 for a period of time longer than what would be used if the user was attempting to enter the character "f" and then move multi-function F key 36 around similar to using a pointing stick (e.g., a TrackPoint®) or some other similar action by the user. Movements of multi-function F key 36 can be echoed on display 16 by movements of a pointer (e.g., cursor 30) and other visual changes. In an embodiment, multi-function F key 36 can operate by sensing applied force by using a pair of resistive strain gauges and the velocity of the pointer can depend on the applied force to multi-function F key 36. Use of multi-function F key 36 may be activated for left-handed users while use of multi-function J key 32 (shown in FIG. 6) may be activated for right-handed users.

In an embodiment, keyboard 18 can include a multi-function key actuator 38. Multi-function key actuator 38 can be configured to allow multi-function F key 36 (or multi-function J key 32) to function as a character key and, when activated, to function as a cursor control. While multi-function key actuator 38 is illustrated as being located in an area of keyboard 18 where a semicolon key is typically located, multi-function key actuator 38 may be located anywhere on keyboard 18.

Figure 8:
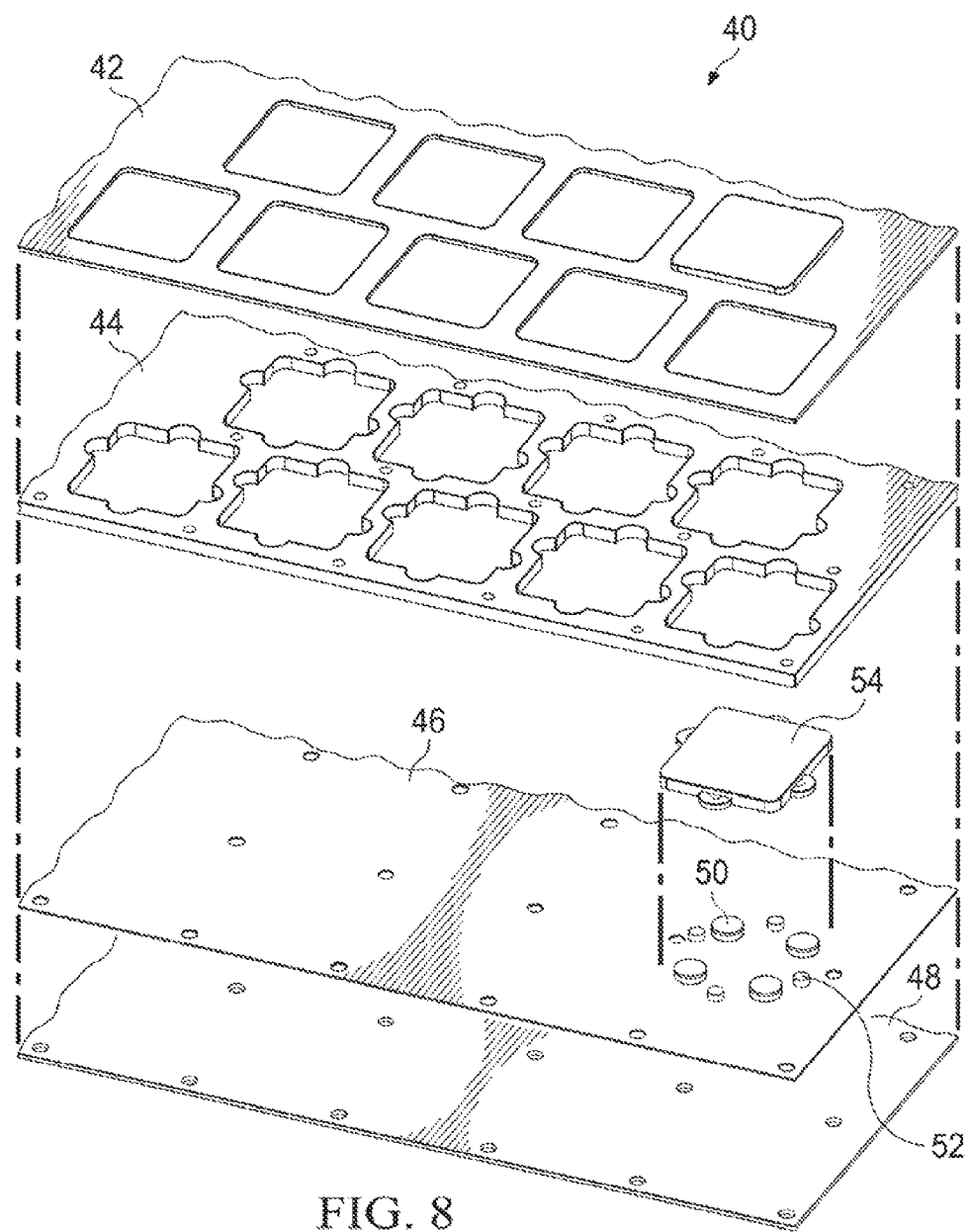
FIG. 8 is a simplified exploded partial view illustrating an embodiment of a keyboard of an electronic device, in accordance with one embodiment of the present disclosure.

Turning to FIG. 8, FIG. 8 is a simplified exploded view diagram illustrating an orthographic view of an electronic keyboard 40 of electronic device 10. In this particular embodiment, electronic keyboard 40 includes nonferrous web 42, key guide 44, conductive layer 46, and base layer 48. Multi-function key 54 (e.g., multi-function space key 20, multi-function J key 32, multi-function F key 36, etc.) can be configured to allow a toggle key configuration. Magnets 52 may be used in conjunction with the keys to provide the rigidity and fall customary to standard computer keyboard keys. Conductive layer 46 can include conductive traces that are connected during a keypress by conductive pads 50 that align with outboard tab portions of multi-function key 54. Multi-function key 54 can be configured to be used as a character key to input a character or as a control device to control a cursor (e.g., cursor 30) on a display (e.g., display 16).

Figure 9:
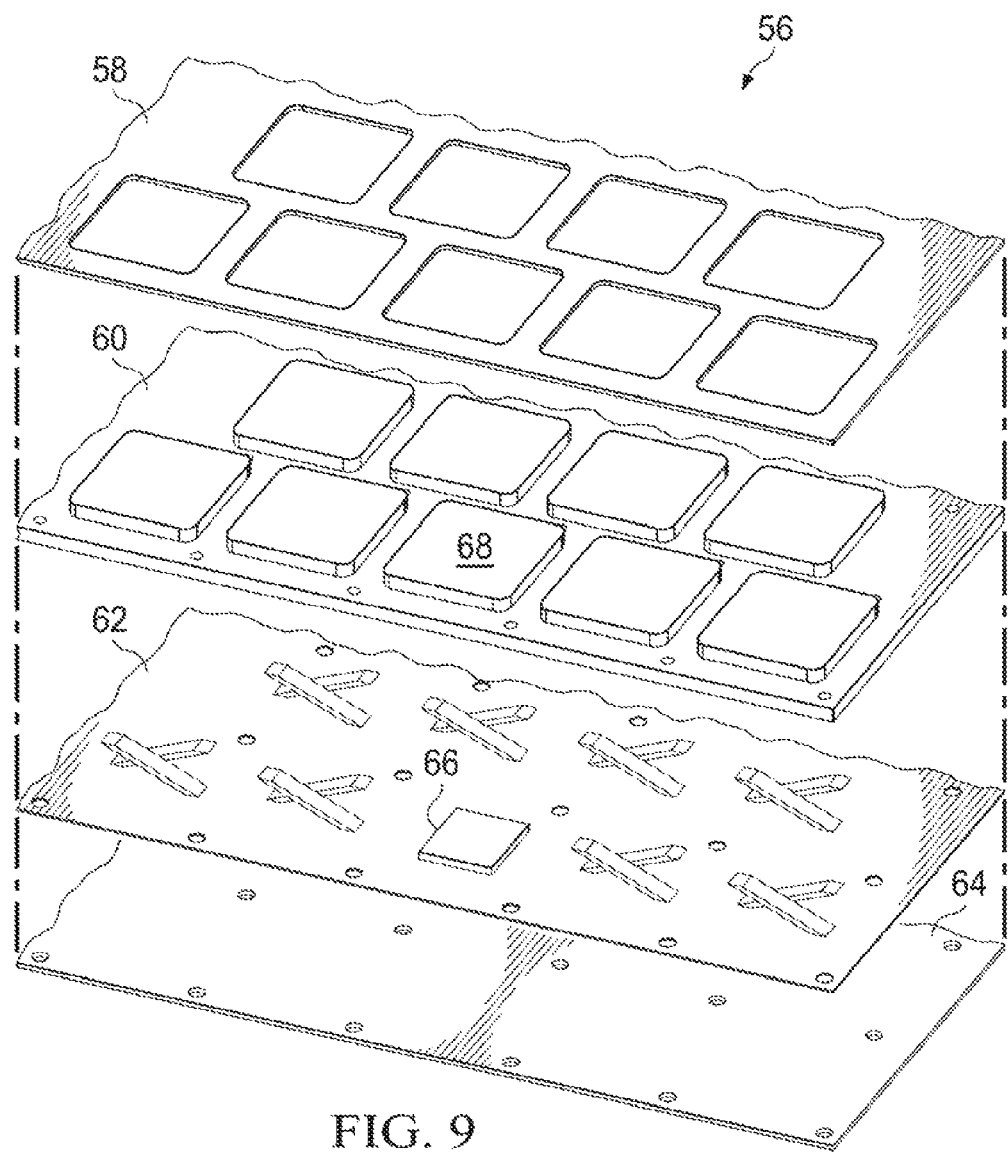
FIG. 9 is a simplified exploded partial view illustrating an embodiment of a keyboard of an electronic device, in accordance with one embodiment of the present disclosure.

Turning to FIG. 9, FIG. 9 is a simplified exploded view diagram illustrating an orthographic view of a mechanical keyboard 56 of electronic device 10. In this particular embodiment, keyboard 18 includes top web 58, a plurality of keys 60, a support layer 62, and a mechanical base layer 64. Plurality of keys 60 can include a mechanical multi-function key 68. Support layer 62 can include a plurality of mechanical key actuators (e.g., rubber dome, scissor key, etc.) and a pointing stick 66 (e.g., similar to a TrackPoint® or some other similar device to control a cursor or pointer). Mechanical multi-function key 68 can be used to control pointing stick 66. Movements of pointing stick 66 can be echoed on a display by movements of a pointer (e.g., cursor 30) and other visual changes. In an embodiment, pointing stick 66 can operate by sensing applied force by using a pair of resistive strain gauges and the velocity of the pointer can depend on the applied force to pointing stick 66.

Figure 10:
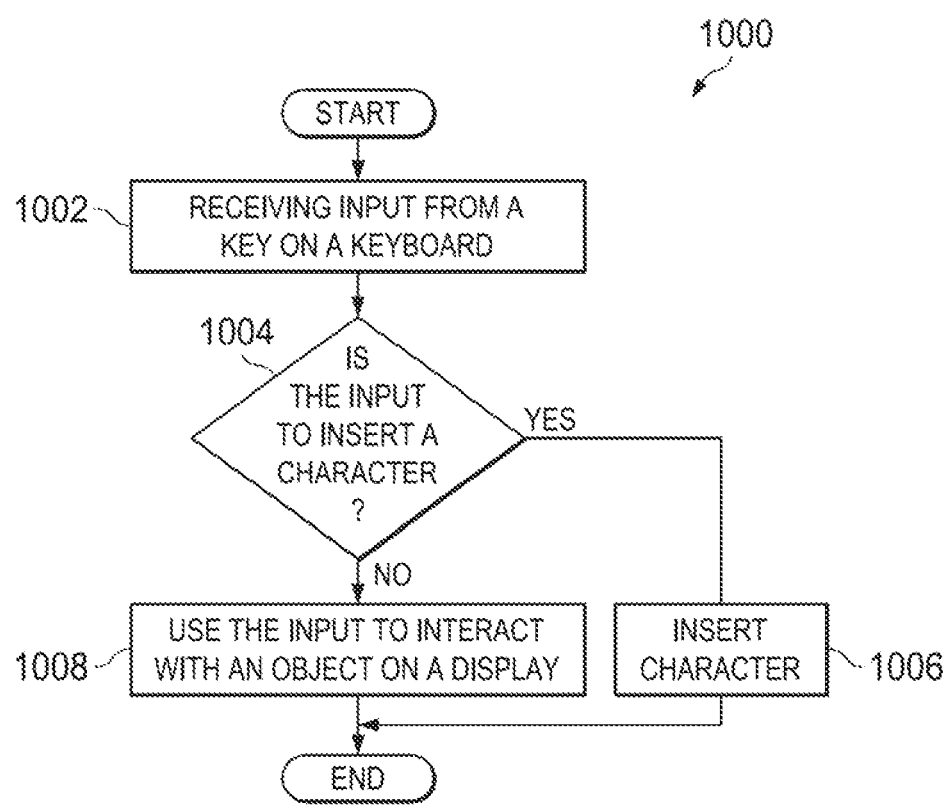
FIG. 10 is a simplified flow diagram illustrating potential operations associated with one embodiment of the present disclosure.

Turning to FIG. 10, FIG. 10 is a simplified flowchart 1000 illustrating example activities of a multi-function key system. At 1002, the system is receiving input from a key on a keyboard. At 1004, the system determines if the input is to insert a character. For example, electronic device 10 can include logic that can determine if the input is to insert a character. If the system determines that the input is to insert a character, then the system uses the input to insert a character, as in 1006. For example, a character may be inserted on display 16. If the system determines that the input is not to insert a character, then the system uses the input to interact with an object on a display, as in 1008. For example, multi-function space key 20, multi-function J key 32, or multi-function F key 36 may be used to control cursor 30 on display 16.

Figure 11:
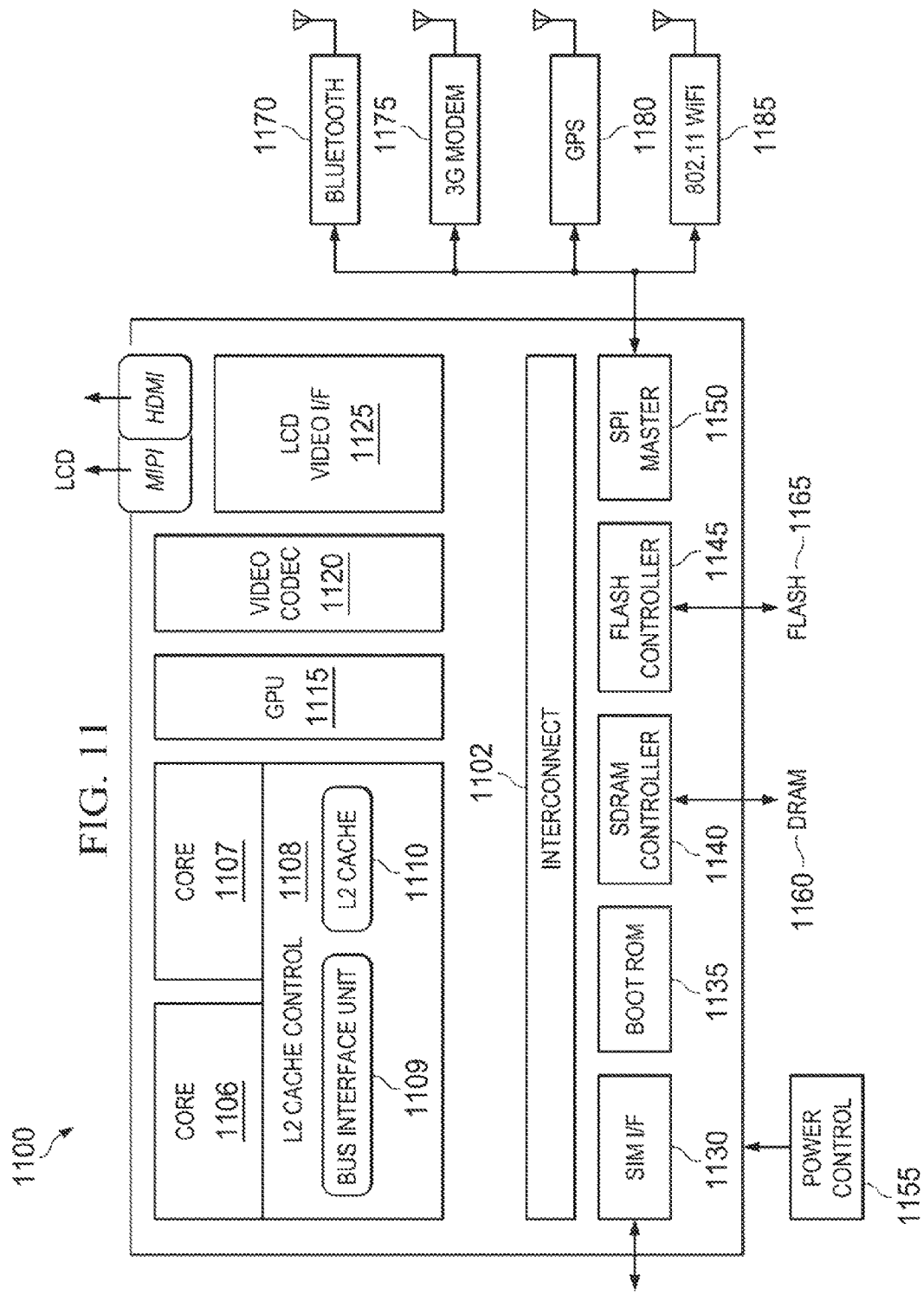
FIG. 11 is a simplified block diagram associated with an example ARM ecosystem system on chip (SOC) of the present disclosure.

Turning to FIG. 11, FIG. 11 is a simplified block diagram associated with an example ARM ecosystem SOC 1100 of the present disclosure. At least one example implementation of the present disclosure can include the multi-function key features discussed herein and an ARM component. For example, the example of FIG. 11 can be associated with any ARM core (e.g., A-9, A-15, etc.). Further, the architecture can be part of any type of tablet, smartphone (inclusive of Android™ phones, i-Phones™), i-Pad™, Google Nexus™, Microsoft Surface™, personal computer, server, video processing components, laptop computer (inclusive of any type of notebook), Ultrabook™ system, any type of touch-enabled input device, etc.

In this example of FIG. 11, ARM ecosystem SOC 1100 may include multiple cores 1106-1107, an L2 cache control 1108, a bus interface unit 1109, an L2 cache 1110, a graphics processing unit (GPU) 1115, an interconnect 1102, a video codec 1120, and a liquid crystal display (LCD) I/F 1125, which may be associated with mobile industry processor interface (MIPI)/high-definition multimedia interface (HDMI) links that couple to an LDC.

ARM ecosystem SOC 1100 may also include a subscriber identity module (SIM) I/F 1130, a boot read-only memory (ROM) 1135, a synchronous dynamic random access memory (SDRAM) controller 1140, a flash controller 1145, a serial peripheral interface (SPI) master 1150, a suitable power control 1155, a dynamic RAM (DRAM) 1160, and flash 1165. In addition, one or more example embodiments include one or more communication capabilities, interfaces, and features such as instances of Bluetooth™ 1170, a 3G modem 1175, a global positioning system (GPS) 1180, and an 802.11 WiFi 1185.

In operation, the example of FIG. 11 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 12:
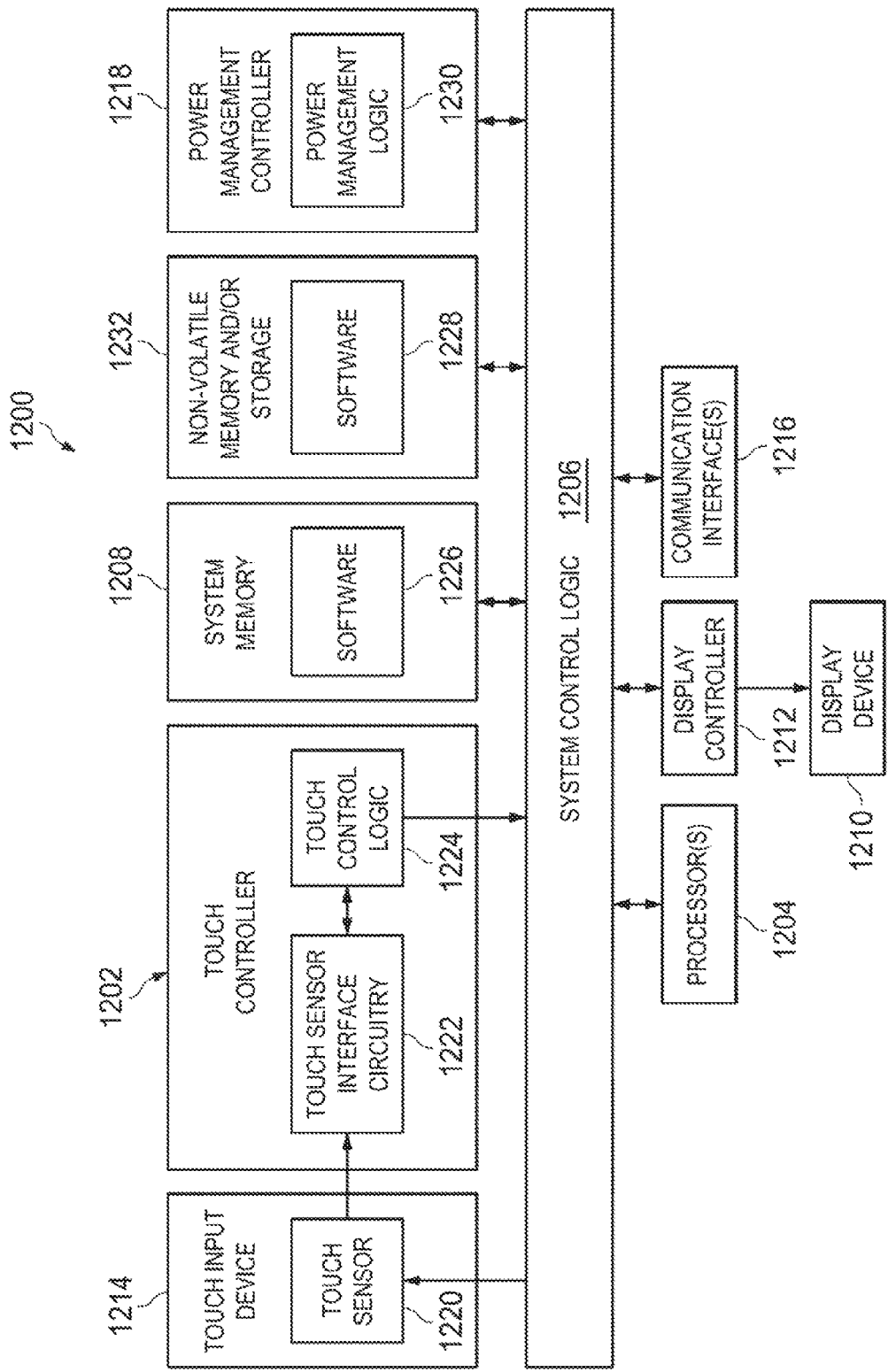
FIG. 12 is a simplified block diagram illustrating example logic that may be used to execute activities associated with the present disclosure.

Turning to FIG. 12, FIG. 12 is a simplified block diagram illustrating potential electronics and logic that may be associated with any of the multi-function key operations discussed herein. In at least one example embodiment, system 1200 can include a touch controller 1202, one or more processors 1204, system control logic 1206 coupled to at least one of processor(s) 1204, system memory 1208 coupled to system control logic 1206, non-volatile memory and/or storage device(s) 1232 coupled to system control logic 1206, display controller 1212 coupled to system control logic 1232, display controller 1212 coupled to a display device 1210, power management controller 1218 coupled to system control logic 1206, and/or communication interfaces 1216 coupled to system control logic 1206.

System control logic 1206, in at least one embodiment, can include any suitable interface controllers to provide for any suitable interface to at least one processor 1204 and/or to any suitable device or component in communication with system control logic 1206. System control logic 1206, in at least one example embodiment, can include one or more memory controllers to provide an interface to system memory 1208. System memory 1208 may be used to load and store data and/or instructions, for example, for system 1200. System memory 1208, in at least one example embodiment, can include any suitable volatile memory, such as suitable dynamic random access memory (DRAM) for example. System control logic 1206, in at least one example embodiment, can include one or more I/O controllers to provide an interface to display device 1210, touch controller 1202, and non-volatile memory and/or storage device(s) 1232.

Non-volatile memory and/or storage device(s) 1232 may be used to store data and/or instructions, for example within software 1228. Non-volatile memory and/or storage device (s) 1232 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 1218 may include power management logic 1230 configured to control various power management and/or power saving functions disclosed herein or any part thereof. In at least one example embodiment, power management controller 1218 is configured to reduce the power consumption of components or devices of system 1200 that may either be operated at reduced power or turned off when the electronic device is in a closed configuration. For example, in at least one example embodiment, when the electronic device is in a closed configuration, power management controller 1218 performs one or more of the following: power down the unused portion of the display and/or any backlight associated therewith; allow one or more of processor(s) 1204 to go to a lower power state if less computing power is required in the closed configuration; and shutdown any devices and/or components that are unused when an electronic device is in the closed configuration.

Communications interface(s) 1216 may provide an interface for system 1200 to communicate over one or more networks and/or with any other suitable device. Communications interface(s) 1216 may include any suitable hardware and/or firmware. Communications interface(s) 1216, in at least one example embodiment, may include, for example, a network adapter, a wireless network adapter, a telephone modem, and/or a wireless modem.

System control logic 1206, in at least one example embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example embodiment, at least one processor 1204 may be packaged together with logic for one or more controllers of system control logic 1206. In at least one example embodiment, at least one processor 1204 may be packaged together with logic for one or more controllers of system control logic 1206 to form a System in Package (SiP). In at least one example embodiment, at least one processor 1204 may be integrated on the same die with logic for one or more controllers of system control logic 1206. For at least one example embodiment, at least one processor 1204 may be integrated on the same die with logic for one or more controllers of system control logic 1206 to form a System on Chip (SoC).

For touch control, touch controller 1202 may include touch sensor interface circuitry 1222 and touch control logic 1224. Touch sensor interface circuitry 1222 may be coupled to detect touch input over a first touch surface layer and a second touch surface layer of a display (i.e., display device 1210). Touch sensor interface circuitry 1222 may include any suitable circuitry that may depend, for example, at least in part on the touch-sensitive technology used for a touch input device. Touch sensor interface circuitry 1222, in one embodiment, may support any suitable multi-touch technology. Touch sensor interface circuitry 1222, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 1224 may be coupled to help control touch sensor interface circuitry 1222 in any suitable manner to detect touch input over a first touch surface layer and a second touch surface layer. Touch control logic 1224 for at least one example embodiment may also be coupled to output in any suitable manner digital touch input data corresponding to touch input detected by touch sensor interface circuitry 1222. Touch control logic 1224 may be implemented using any suitable logic, including any suitable hardware, firmware, and/or software logic (e.g., non-transitory tangible media), that may depend, for example, at least in part on the circuitry used for touch sensor interface circuitry 1222. Touch control logic 1224 for at least one embodiment may support any suitable multi-touch technology.

Touch control logic 1224 may be coupled to output digital touch input data to system control logic 1206 and/or at least one processor 1204 for processing. At least one processor 1204 for at least one embodiment may execute any suitable software to process digital touch input data output from touch control logic 1224. Suitable software may include, for example, any suitable driver software and/or any suitable application software. As illustrated in FIG. 12, system memory 1208 may store suitable software 1226 and/or non-volatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

Example embodiments described herein can include a display portion including a display; and a keyboard portion including a plurality of keys. A selected one of the plurality of keys is a multi-function key configured to register a character on the display, and the multi-function key is configured to control movement of a cursor on the display. In yet other embodiments, the multi-function key is a space bar having a surface area substantially larger than other keys of the plurality of keys. The multi-function key can be rectangular shaped and sufficiently large to receive simultaneous contacts associated with each thumb of a user when the user types on the keyboard portion.

In other implementations, the multi-function key is a J key or an F key on a QWERTY keyboard. In addition, logic can be provided to determine if input on the multi-function key is associated with registering the character on the display or is associated with controlling movement of a cursor on the display. The multi-function key can be teardrop shaped and sufficiently large to receive simultaneous contacts associated with each thumb of a user when the user types on the keyboard portion. In certain cases, a multi-function key actuator is configured to register the character on the display, and to control movement of the cursor on the display. A dragging motion across the multi-function key causes the multi-function key to control movement of the cursor on the display.

In at least one system implementation, a system is provided and includes means for receiving an input for a key on a keyboard, where the key is a multi-function key configured to register a character on a display of an electronic device, and where the multi-function key is configured to control movement of a cursor in multiple directions on the display. The system can also include means for displaying the character if the input is to register the character; and means for controlling movement of the cursor on the display if the input is to control the cursor. In certain implementations, the multi-function key is a space bar having a surface area substantially larger than other keys of the plurality of keys. Additionally, the multi-function key could be generally rectangular shaped. In other embodiments, the multi-function key is a J key or an F key on a QWERTY keyboard. In yet other examples, the multi-function key can be implemented to control the cursor using a pressure sensitive mechanism.

What is claimed is:

1. An electronic device, comprising:
    a display portion including a display; and
    a keyboard portion including a plurality of mechanical keys and a power source, wherein at least a portion of the mechanical keys are biased upwards and include electrically conductive pads and magnets beneath each key of the portion of the mechanical keys, wherein at least two of the plurality of mechanical keys are multi-function keys and include a first multi-function key and a second multi-function key, wherein each multi-function key is configured to register a character on the display in response to a first type of user input and is configured to control movement of a cursor in multiple directions on the display in response to a second type of user input, wherein a strain gauge is located proximate to or in each of the multi-function keys and at least partially determines when input is the first type of user input or the second type of user input, wherein in response to an applied force on a specific multi-function key, the strain gauge can control the velocity of the movement of the cursor.

2. The electronic device of claim 1, further comprising:
    a third multi-function key, wherein the third multi-function key is a space bar having a surface area substantially larger than other keys of the plurality of mechanical keys.

3. The electronic device of claim 1, wherein the third multi-function key is sufficiently large to receive simultaneous contacts associated with each thumb of a user when the user types on the keyboard portion.

4. The electronic device of claim 1, wherein the first multi-function key is a J key and the second multi-function key is an F key on a QWERTY keyboard.

5. The electronic device of claim 1, further comprising:
    logic to at least partially determine if input on the first multi-function key or the second multi-function key is associated with registering the character on the display or is associated with controlling movement of a cursor on the display.

6. The electronic device of claim 2, wherein the third multi-function key is teardrop shaped and sufficiently large to receive simultaneous contacts associated with each thumb of a user when the user types on the keyboard portion.

7. The electronic device of claim 2, wherein the third multi-function key is to control movement of the cursor on the display in response to a dragging motion across the third multi-function key.

8. A keyboard, comprising:
    a power source; and
    a plurality of mechanical keys, wherein at least a portion of the mechanical keys are biased upwards and include electrically conductive pads and magnets beneath each key of the portion of the mechanical keys, wherein at least two of the plurality of mechanical keys are multi-function keys and include a first multi-function key and a second multi-function key, where each multi-function key is configured to register a character on the display in response to a first type of user input and is configured to control movement of a cursor in multiple directions on the display in response to a second type of user input, wherein a strain gauge is located proximate to or in each of the multi-function keys and at least partially determines when input is the first type of user input or the second type of user input, wherein in response to an applied force on a specific multi-function key, the strain gauge can control the velocity of the movement of the cursor; and
    a space bar configured to register a character on the display in response to the first type of user input and to control movement of a cursor in multiple directions on a display in response to the second type of user input, wherein the space bar is a mechanical space bar.

9. The keyboard of claim 8, wherein the space bar has a surface area substantially larger than other keys of the plurality of keys.

10. The keyboard of claim 8, wherein the space bar is generally rectangular shaped.

11. The keyboard of claim 8, further comprising:
logic to determine if input on the space bar associated with registering the character on the display or is associated with controlling movement of a cursor on the display.

12. The keyboard of claim 8, wherein the space bar is teardrop shaped and sufficiently large to receive simultaneous contacts associated with each thumb of a user when the user types on the keyboard portion.

13. The keyboard of claim 8, further comprising:
a multi-function key actuator configured to register the character on the display, and to control movement of the cursor on the display.

14. The keyboard of claim 8, wherein the space bar is a third multi-function key and is to control movement of the cursor on the display in response to a dragging motion across the space bar.

15. A method, comprising:
receiving an input for a first mechanical key on a keyboard or a second mechanical key on the keyboard, wherein the keyboard includes a plurality of mechanical keys and at least a portion of the mechanical keys are biased upwards and include electrically conductive pads and magnets beneath each key of the portion of the mechanical keys, wherein the first mechanical key and the second mechanical key are multi-function keys configured to register a character on a display of an electronic device in response to a first type of user input, and wherein the first mechanical key and the second mechanical key are configured to control movement of a cursor in multiple directions on the display in response to a second type of user input, wherein a strain gauge is located proximate to or in each of the multi-function keys and at least partially determines when input is the first type of user input or the second type of user input, wherein in response to an applied force on a specific multi-function key, the strain gauge can control the velocity of the movement of the cursor; and
displaying the character upon the determination that input to the first mechanical key or the second mechanical key is the first type of user input; and
controlling movement of the cursor on the display upon the determination that input to the first mechanical key or the second mechanical key is the second type of user input.

16. The method of claim 15, wherein the keyboard includes a third multi-function key, and the third multi-function key is a space bar having a surface area substantially larger than other keys on the keyboard.

17. The method of claim 16, wherein the third multi-function key is sufficiently large to receive simultaneous contacts associated with each thumb of a user when the user types on the keyboard.

18. The method of claim 16, wherein the third multi-function key is teardrop shaped and sufficiently large to receive simultaneous contacts associated with each thumb of a user when the user types on the keyboard.

19. The method of claim 15, wherein a multi-function key actuator is configured to register the character on the display, and to control movement of the cursor on the display.

20. A system, comprising:
at least one non-transitory computer-readable medium comprising one or more instructions that when executed by at least one processor, cause the processor to:
receive an input for a first mechanical key on a keyboard or a second mechanical key on the keyboard, wherein the keyboard includes a plurality of mechanical keys and at least a portion of the mechanical keys are biased upwards and include electrically conductive pads and magnets beneath each key of the portion of the mechanical keys, wherein the first mechanical key and the second mechanical key are multi-function keys configured to register a character on a display of an electronic device in response to a first type of user input, and wherein the first mechanical key and the second mechanical key are configured to control movement of a cursor in multiple directions on the display in response to a second type of user input, wherein a strain gauge is located proximate to or in each of the multi-function keys and at least partially determines when input is the first type of user input or the second type of user input, wherein in response to an applied force on a specific multi-function key, the strain gauge can control the velocity of the movement of the cursor; and
display the character upon the determination that input to the first mechanical key or the second mechanical key is the first type of user input; and
control movement of the cursor on the display upon the determination that input to the first mechanical key or the second mechanical key is the second type of user input.

21. The system of claim 20, wherein the keyboard includes a third multi-function key, and the third multifunction key is a space bar having a surface area substantially larger than other keys on the keyboard.

22. The system of claim 20, wherein the third multi-function key is generally rectangular shaped.

23. The system of claim 20, wherein the first mechanical key is a J key and the second mechanical key is an F key on a QWERTY keyboard.

24. The system of claim 20, wherein the first mechanical key key can be implemented to control the cursor using a pressure sensitive mechanism.

25. The electronic device of claim 1, wherein the first user input is a tap and the second user input is pressure.

* * * * *

UNITED STATES PATENT AND TRADEMARK OFFICE
CERTIFICATE OF CORRECTION

PATENT NO. : 9,529,393 B2 Page 1 of 1
APPLICATION NO. : 14/126317
DATED : December 27, 2016
INVENTOR(S) : Steven W. Asbjomsen et al.

It is certified that error appears in the above-identified patent and that said Letters Patent is hereby corrected as shown below:

In the Claims

In Column 16, Lines 41-42, in Claim 21, delete "multifunction" and insert -- multi-function --, therefor.

In Column 16, Line 50, in Claim 24, delete "key key" and insert -- key --, therefor.

Signed and Sealed this
Seventh Day of March, 2017

Michelle K. Lee
*Director of the United States Patent and Trademark Office*